US010799949B2

(12) United States Patent
Vukovic et al.

(10) Patent No.: US 10,799,949 B2
(45) Date of Patent: Oct. 13, 2020

(54) SLIDE CLOSURE ON THE SPOUT OF A METALLURGICAL VESSEL

(71) Applicant: Refractory Intellectual Property GmbH & Co. KG, Vienna (AT)

(72) Inventors: Goran Vukovic, Vienna (AT); Klaus Gamweger, Trofaiach (AT); Bojan Zivanovic, Vienna (AT)

(73) Assignee: Refractory Intellectual Property & GmbH & Co. KG, Vienna (AT)

( * ) Notice: Subject to any disclaimer, the term of this patent is extended or adjusted under 35 U.S.C. 154(b) by 162 days.

(21) Appl. No.: 15/779,191

(22) PCT Filed: Nov. 29, 2016

(86) PCT No.: PCT/EP2016/079100
§ 371 (c)(1),
(2) Date: May 25, 2018

(87) PCT Pub. No.: WO2017/093236
PCT Pub. Date: Jun. 8, 2017

(65) Prior Publication Data
US 2018/0345364 A1 Dec. 6, 2018

(30) Foreign Application Priority Data
Dec. 1, 2015 (EP) .................................... 15197202

(51) Int. Cl.
*B22D 41/36* (2006.01)
*B22D 41/24* (2006.01)
(Continued)

(52) U.S. Cl.
CPC ............. *B22D 41/36* (2013.01); *B22D 2/001* (2013.01); *B22D 41/08* (2013.01); *B22D 41/22* (2013.01);
(Continued)

(58) Field of Classification Search
CPC ........ B22D 2/001; B22D 41/08; B22D 41/22; B22D 41/24; B22D 41/36; B22D 41/60
(Continued)

(56) References Cited

U.S. PATENT DOCUMENTS 4,816,758 A    3/1989  Theissen et al.
4,971,294 A *  11/1990 Sherrill ................. C21C 5/5241
                                                         222/593

(Continued)

FOREIGN PATENT DOCUMENTS

DE    19644345    *  4/1998  ............. B22D 41/36
DE    19644345 A1    4/1998
(Continued)

OTHER PUBLICATIONS

Abstract of JPS5930468.
Abstract of DE19644345.

*Primary Examiner* — Scott R Kastler
*Assistant Examiner* — Michael Aboagye
(74) *Attorney, Agent, or Firm* — Brian Roffe

(57) ABSTRACT

Slide closure unit on the spout of a metallurgical vessel, preferably a copper-anode furnace, includes a housing in which refractory closure plates, as well as at least one connecting refractory inner casing, are arranged. A removable induction heater is provided, having at least one induction coil surrounding the refractory inner casing outside of the housing. In this way, it is possible to constantly keep the melt located in the outlet channel of the spout sufficiently warm so that it does not freeze before and/or during the pouring of the melt, or that any frozen metal and/or slag can be melted in the spout.

20 Claims, 2 Drawing Sheets

(51) Int. Cl.
  *B22D 41/08*   (2006.01)
  *B22D 2/00*    (2006.01)
  *B22D 41/60*   (2006.01)
  *B22D 41/22*   (2006.01)
  *B22D 11/18*       (2006.01)
  *B22D 41/54*       (2006.01)

(52) U.S. Cl.
  CPC ............ *B22D 41/24* (2013.01); *B22D 41/60* (2013.01); *B22D 11/186* (2013.01); *B22D 41/54* (2013.01)

(58) Field of Classification Search
  USPC ................ 266/236; 222/590, 592, 597, 600; 164/47, 457
  See application file for complete search history.

(56) References Cited

U.S. PATENT DOCUMENTS

| | | | |
|---|---|---|---|
| 6,210,629 B1 * | 4/2001 | Bruckner | ............... B22D 41/14 222/590 |
| 8,771,587 B2 | 7/2014 | Amsler et al. | |
| 2019/0375001 A1 * | 12/2019 | Manhart | ............... C21C 5/4653 |

FOREIGN PATENT DOCUMENTS

| | | |
|---|---|---|
| EP | 0198910 B1 | 5/1986 |
| EP | 2366474 A1 | 9/2011 |
| EP | 2318559 B1 | 10/2014 |
| JP | S593046 A | 2/1984 |
| WO | 9815374 A1 | 4/1998 |
| WO | 2017093236 A1 | 6/2017 |

\* cited by examiner

SLIDE CLOSURE ON THE SPOUT OF A METALLURGICAL VESSEL

FIELD OF THE INVENTION

The invention relates to a slide closure on the spout of a metallurgical vessel including a housing in which refractory closure plates and at least one connecting refractory inner casing are arranged.

BACKGROUND OF THE INVENTION

This type of slide closure is disclosed in publication EP 2 318 559, for example on an anode copper furnace. Molten copper is cleaned within the latter by means of fire refining to form anode copper, and then the copper is poured in anode form, the flow velocity of the copper being regulated by controlling the outflow quantity by means of the slide closure disposed on the end of the spout. In this way, the casting process can be performed without further rotation of the furnace drum. However, with this type of furnace it is a disadvantage that when the slide closure is closed or greatly restricted, and also when it is open, the melt located in the spout channel may freeze, and the functional capability of the pouring is affected such that operation of the system is interrupted.

With certain metallurgical furnaces provision is made to keep the outlet channel of the spout closed with a plugging mass in the furnace which contains melt during operation before pouring takes place. Consequently, this plugging mass must be drilled out of the outlet channel and the melt and/or slag that has frozen therein must be melted with a lance. This generally leads to uncontrolled and rapid wear of the refractory materials forming the spout.

OBJECTS AND SUMMARY OF THE INVENTION

The object underlying the invention is to avoid these disadvantages and to devise a slide closure for a metallurgical vessel of the type specified at the start which guarantees the full functional capability of the vessel during the entire pouring process.

According to the invention, this object is achieved by a removable induction heater being provided, having at least one induction coil at least partially surrounding the at least one refractory inner casing outside of and/or within the housing.

In this way, it is possible to constantly keep the melt located in the outlet channel of the spout sufficiently warm that it does not freeze before and/or during the pouring of the melt, or that any frozen metal and/or slag can be melted in the spout.

Accordingly, the melt and/or the slag frozen in the outlet channel can already be melted with the induction coil before pouring if the slide closure is closed. In this way, the entire casting process can be performed more safely and can be controlled or monitored better, and in addition, a longer service life of the refractory materials of the spout is achieved. In this way, one can dispense with the use of a plugging mass and drilling out of the latter or with the melting of frozen melt or slag with a conventional lance.

The invention also makes provision such that the induction heater is composed of an induction coil surrounding the spout and a cooling system that includes the latter. By this measure, the induction coil is prevented from being heated through the lining or the outer cladding of the furnace, as is the slide closure that overheats during operation. In order to concentrate the heat output of the induction coil on the pouring channel with the lowest possible losses, the invention makes provision such that the induction coil is embedded in a supporting body made of ferritic material and that the cooling system is provided with a cooling chamber that encloses the supporting body peripherally and with a cooling chamber adjacent to the side wall of the supporting body directed towards the furnace.

The cooling system of the induction coil offers a further advantage, namely that targeted solidification of the melt or slag in the spout of a furnace is made possible when the slide closure is closed. This may also serve, for example, as protection against rupture so as to guarantee safe operation of a furnace between two casting processes, which could be important with certain metallurgical furnaces, for example when its spout is below the bath level during operation.

According to the invention, the supporting body, along with the cooling chambers surrounding it, is fitted in a support plate fastened to the steel cladding, a spacer ring, made for example of copper material, supported against the supporting body of the induction coil, being inserted between the support plate and the slide closure. The slide closure or the refractory materials on the spout can thus be fitted and removed separately from the assembly consisting of the supporting body, the induction coil and the cooling chambers.

According to the invention, the spout consists of a perforated brick disposed in the refractory furnace lining and an inner casing made of refractory material connected to said perforated brick and forming the outlet channel of the spout, which inner casing is provided in the region of the induction coil with an annular insert having appropriate electrical and thermal properties, such as for example made of graphite or material containing graphite. The heating effect of the induction coil upon the melt and/or the slag located within the spout channel is thus increased.

Depending on the molten metal and/or the slag that is to be cast, the inner casing is provided in the region of the insert with a hard layer that protects the inner surface of the insert, made, for example, of clay material or SiC. The outflowing melt and/or the slag and/or the oxidizing gas, such as for example air, is/are thus prevented from attacking the insert. This protective effect may also be extended to the entire inner casing by the hard layer being extended beyond the insert.

BRIEF DESCRIPTION OF THE DRAWINGS

In the following, the invention is explained in more detail by means of an exemplary embodiment with reference to the drawings. These show as follows.

DETAILED DESCRIPTION OF THE INVENTION

Figure 1:
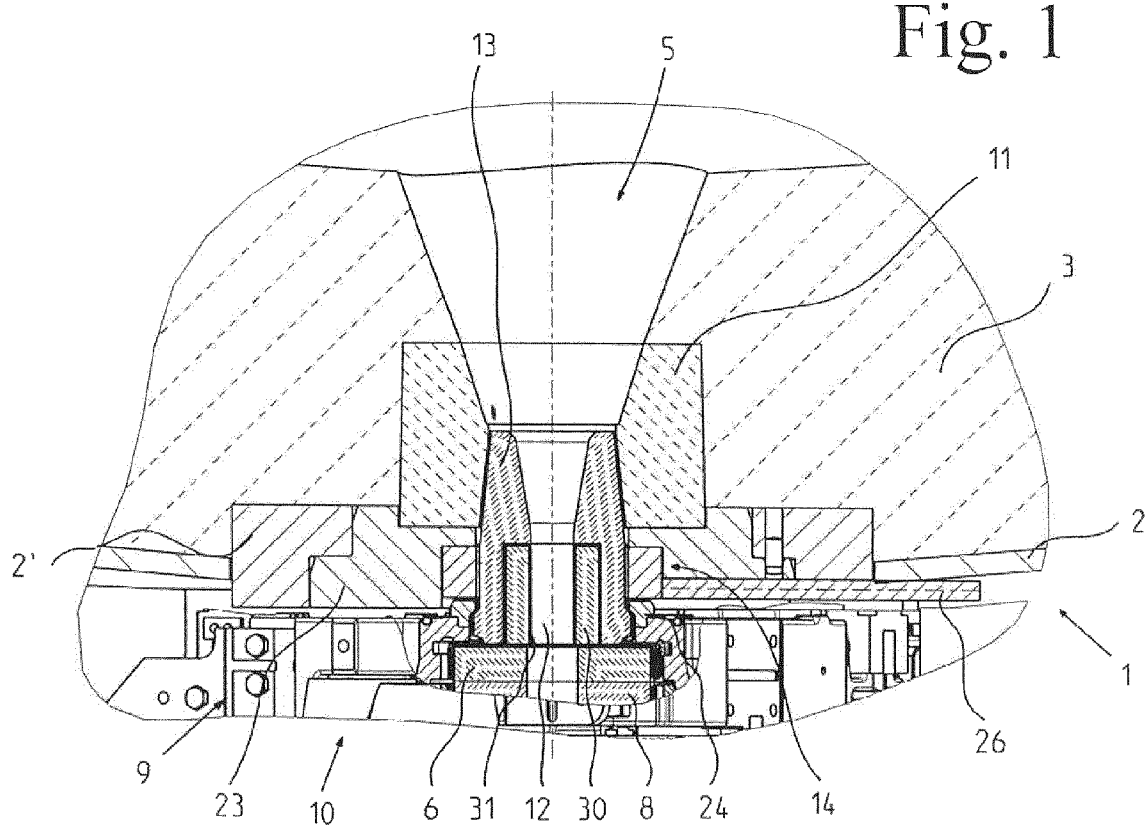
FIG. 1 is a partial cross-section or a partial view of a slide closure according to the invention and the spout of a copper anode furnace.

FIG. 1 shows a slide closure 10 on a spout 5 of a metallurgical furnace, preferably a copper-anode furnace 1, which comprises an outer steel cladding 2 and a refractory lining 3. In the lining 3, this spout 5 is formed running radially outwards with a perforated brick 11 with the outlet opening 12.

Instead of a copper-anode furnace, other vessels with the slide closure or a similar closing device could also be provided, such as for example, a converter with a run-off which is formed from a number of aligned casings without a perforated brick, a flash smelting furnace, an electric melting furnace or similar metallurgical vessels.

The slide closure 10, of which not all details are displayed, is designed in a conventional manner. In particular, the latter is provided with a housing 9 fastened to the outside of the furnace, into which housing at least one refractory closure plate 6 is inserted and an inner casing 13 adjoining above the latter is fastened detachably. This slide closure 10 additionally has a moveable refractory slider plate 8, as indicated, which is held in a unit (not detailed) and is pressed against the upper closure plate 6 and can be moved relative to the latter into an open or closed position of the slide closure.

According to the invention, a removable induction heater 14, which has an induction coil 15 surrounding the inner casing 13 above the housing 9, is placed on the spout 5. Advantageously, there is assigned to the housing 9, a support ring or plate 23 which is fixed in a holding plate 2' fastened in the steel cladding 2 of the furnace 1.

In order to optimize the heating effect of the induction coil 15 in the outlet channel 12 of the spout, an annular insert 30, preferably made of graphite or a material containing graphite, is provided in the inner casing 13 in the region of the induction coil 15. Advantageously, the insert 30 is provided with an insulating layer on the rear side and/or on both front sides.

Depending on the molten metal and/or the slag that is to be poured, it is advantageous if the inner casing 13 is provided with a hard layer 31, preferably made of clay $Al_2O_3$ or SiC, in the region of the insert 30, by means of which layer the inner surface of the insert is protected against the outflowing melt and/or the slag and/or oxidizing gas, such as for example air. The hard layer 31 may optionally be extended beyond the annular insert 30. In order to facilitate fitting, the inner casing 13 is centered in the housing 9 and in the spacer ring 24 and is inserted into the perforated brick 11 from the outside.

Alternatively, the annular insert 30 could be produced at least partially from SiC, on which no hard layer is to be provided on the inside, or it could be produced from a coated graphite.

Figure 2:
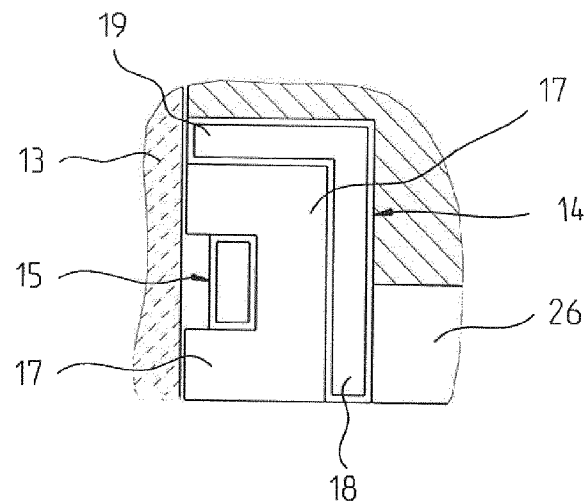
FIG. 2 is an enlarged schematic cross-section through an induction heater of the slide closure according to FIG. 1.

As is evident from FIG. 2, the induction coil 15 is embedded in a supporting body 17 made of ferritic material. The supporting body 17 along with the cooling chambers 18, 19 surrounding it are fitted in the support plate 23. Furthermore, the induction heater 14 is advantageously encased on the rear and side walls with an insulating layer. In addition, a spacer ring 24, preferably made of copper material, is inserted between this supporting body 17 and the slide closure 10. This spacer ring 24 likewise serves to center the inner casing 13 in the spout 5. However, two separate rings could also be provided. A longitudinally running line with a groove or the like for receiving at least one line 26, such as a power supply line and a coolant line, for the induction coil 15 is also provided between the support plate 23, the holding plate 2' and the housing 9.

The housing 9 is fastened to the support plate 23 or the holding plate 2' and can be separately fitted and removed together and with the inner casing 13 from the induction heater 14 with the supporting body 17, the induction coil 15 and the cooling chambers 18, 19.

Figure 3:
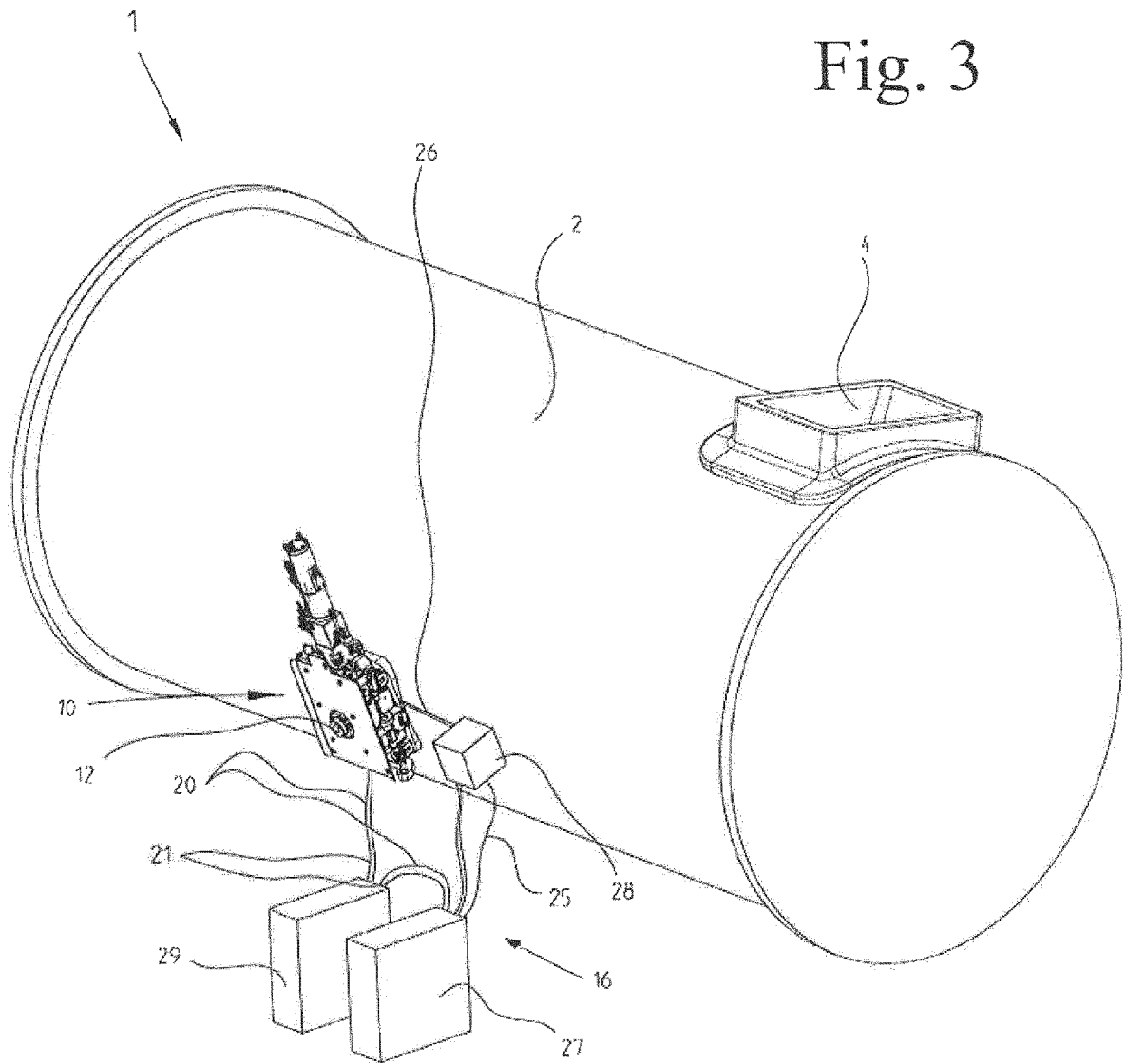
FIG. 3 is a copper anode furnace according to the invention with a device, illustrated perspectively.

FIG. 3 illustrates a copper-anode furnace 1 with a slide closure 10 fitted to its spout, which slide closure comprises a furnace drum having a steel cladding 2 and a filling opening 4. The copper melt that is cleaned in the furnace by a special treatment is then poured through the slide closure 10 which is fitted on the spout on the periphery of the furnace drum.

In the copper-anode furnace 1, an external generator 27 and a transformer 28 connected to the latter via lines 25, are preferably provided in the spout for the operation of the induction heater 14, said transformer being attached, for example, to the furnace 1. In addition, this power supply line 26 leading from the transformer 28 to the induction coil 15 as well as the cooling line are provided. The generator and the transformer could also be formed as one unit and be attached to the furnace or be positioned separately from the latter.

By means of a cooling system 16 having a cooling unit 29 and feed and return lines 20, 21 on the one hand, coolant is conveyed into the induction coil 15 and the cooling chambers 18, 19 of the induction heater 14, and on the other hand to the generator 27 and the transformer 28 with sufficient cooling capacity.

The invention can basically also be used in all metallurgical furnaces the spout of which is provided with a slide closure disposed on the end of the spout.

The induction heater 14 according to the invention is activated either manually or automatically in cooperation with the actuation device of the slide closure. Depending on the type or structure of the furnace, a number of induction coils distributed over the length of the spout can be included.

The invention claimed is:

1. A slide closure unit for a spout of a metallurgical vessel, the slide closure unit comprising:
   a housing;
   a support plate alongside the housing;
   refractory closure plates arranged at least partly in the housing;
   a refractory inner casing arranged at least partly in the housing;
   a removable induction heater comprising:
      a supporting body made of ferritic material;
      at least one induction coil surrounding at least part of the refractory inner casing, the at least one induction coil being embedded in the supporting body; and
      at least one cooling chamber around at least part of the supporting body, the supporting body and the at least one cooling chamber being removably fitted in the support plate; and
   a spacer ring supported against the supporting body, the spacer ring being arranged between part of the support plate and at least one of the refractory closure plates.

2. The slide closure unit according to claim 1, further comprising a cooling system having a cooling unit that provides coolant to the at least one induction coil and the at least one cooling chamber.

3. The slide closure unit according to claim 2, wherein solidification of at least one of the melt and slag in the spout of a furnace is achieved with the cooling system.

4. The slide closure unit according to claim 2, further comprising a generator and a transformer that provide power to the at least one induction coil, wherein the cooling system supplies coolant to the generator and the transformer.

5. A spout on a metallurgical vessel having a slide closure unit according to claim 1, wherein the spout is defined in part by a perforated brick disposed in a refractory furnace lining, wherein the perforated brick is connected to the refractory inner casing forming an outlet channel of the spout, and wherein the refractory inner casing is provided in a region of the at least one induction coil with an annular refractory insert made of a material that causes an increase in a heating effect.

6. The spout according to claim 5, wherein the annular refractory insert is produced from graphite or material containing graphite or at least partially from SiC or from a coated graphite.

7. The spout according to claim 5, wherein the refractory inner casing is provided in a region of the annular refractory insert with a hard layer protecting an inner surface of the annular refractory insert.

8. The spout according to claim 5, further comprising a hard layer arranged in a region of the annular refractory insert and also in an area that extends beyond the annular refractory insert.

9. The spout according to claim 5, wherein the refractory inner casing with the annular refractory insert is insertable into the perforated brick from an outside of the metallurgical vessel.

10. The spout according to claim 5, wherein the refractory inner casing is provided in a region of the annular refractory insert with a hard layer protecting an inner surface of the annular refractory insert, the hard layer being made of clay or SiC.

11. The slide closure unit according to claim 1, wherein the metallurgical vessel is a copper-anode furnace.

12. The slide closure unit according to claim 1, wherein the at least one cooling chamber includes a first cooling chamber at least partly above the at least one induction coil in a direction away from the refractory closure plates, and a second cooling chamber at least partly radially outward of the at least one induction coil.

13. The slide closure unit according to claim 1, wherein the at least one cooling chamber comprises a first cooling chamber that encloses the supporting body peripherally and a second cooling chamber adjacent to a wall of the supporting body on a side away from the refractory closure plates.

14. The slide closure unit according to claim 1, wherein the at least one induction coil is configured to surround the spout when the slide closure unit is installed on the vessel.

15. The slide closure unit according to claim 1, wherein the support plate is configured to be fastened to the spout when the slide closure unit is installed on the vessel.

16. The slide closure unit according to claim 1, wherein the at least one induction coil partially surrounds the refractory inner casing outside of the housing.

17. The slide closure unit according to claim 1, wherein the at least one induction coil partially surrounds the refractory inner casing outside of and within the housing.

18. The slide closure unit according to claim 1, wherein the at least one induction coil partially surrounds the refractory inner casing within the housing.

19. The slide closure unit according to claim 1, wherein the at least one induction coil surrounds the inner casing above the housing.

20. The slide closure unit according to claim 1, wherein the support plate is an annular support ring.

\* \* \* \* \*